United States Patent
Daly et al.

(10) Patent No.: US 8,923,807 B2
(45) Date of Patent: *Dec. 30, 2014

(54) DONUT ALERT MESSAGING

(71) Applicant: AT&T Intellectual Property I, LP, Atlanta, GA (US)

(72) Inventors: Brian Kevin Daly, Peachtree Corners, GA (US); Charles Peter Musgrove, Henderson, NV (US); DeWayne A. Sennett, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,120

(22) Filed: Feb. 5, 2014

(65) Prior Publication Data
US 2014/0162591 A1 Jun. 12, 2014

Related U.S. Application Data

(63) Continuation of application No. 13/712,488, filed on Dec. 12, 2012, now Pat. No. 8,688,071.

(51) Int. Cl.
*H04M 11/04* (2006.01)
*H04L 29/06* (2006.01)
*H04W 24/00* (2009.01)
*H04B 1/38* (2006.01)
*H04W 4/22* (2009.01)
*H04W 4/02* (2009.01)

(52) U.S. Cl.
CPC . *H04W 4/22* (2013.01); *H04B 1/38* (2013.01); *H04L 29/06* (2013.01); *H04M 11/04* (2013.01); *H04W 24/00* (2013.01); *H04W 4/02* (2013.01)

USPC ............ 455/404.2; 455/414.3; 455/456.5; 455/90.1

(58) Field of Classification Search
USPC ............ 455/90.1, 404.1, 404.2, 414.1, 414.2, 455/414.3, 456.1, 456.3, 456.5
See application file for complete search history.

(56) References Cited

U.S. PATENT DOCUMENTS

| | | | | |
|---|---|---|---|---|
| 6,480,121 B1* | 11/2002 | Reimann | ...................... | 340/990 |
| 6,526,268 B1* | 2/2003 | Marrah et al. | ............. | 455/186.1 |
| 6,745,021 B1* | 6/2004 | Stevens | ...................... | 455/404.1 |
| 7,301,455 B2* | 11/2007 | McKenna et al. | ............. | 340/540 |
| 7,653,375 B2* | 1/2010 | Kim et al. | .................... | 455/404.1 |
| 8,237,559 B2* | 8/2012 | Theimer et al. | .......... | 340/539.13 |
| 2007/0298758 A1* | 12/2007 | Verma et al. | ................ | 455/404.1 |
| 2008/0214207 A1* | 9/2008 | Karabinis | ................... | 455/456.1 |
| 2009/0247113 A1* | 10/2009 | Sennett et al. | ............. | 455/404.1 |
| 2009/0247116 A1* | 10/2009 | Sennett et al. | ............. | 455/404.2 |
| 2009/0309742 A1* | 12/2009 | Alexander et al. | ............ | 340/601 |
| 2010/0003958 A1* | 1/2010 | Ray et al. | .................... | 455/404.2 |
| 2010/0180295 A1* | 7/2010 | Ratsch et al. | .................... | 725/34 |
| 2010/0190468 A1* | 7/2010 | Scott et al. | ................. | 455/404.2 |
| 2010/0240339 A1* | 9/2010 | Diamond | ................... | 455/404.2 |

(Continued)

FOREIGN PATENT DOCUMENTS

WO    WO 2008/051303 A2    5/2008

*Primary Examiner* — Christopher M Brandt
(74) *Attorney, Agent, or Firm* — Baker & Hostetler LLP

(57) ABSTRACT

Different emergency alert messages may be provided to different mobile devices within a common geographic region subdivided into a plurality of inner regions. Each inner region may have different emergency alert messages and may be geographically located inside another region.

20 Claims, 10 Drawing Sheets

(56) References Cited

U.S. PATENT DOCUMENTS

| | | | |
|---|---|---|---|
| 2011/0230202 A1* | 9/2011 | Wood et al. | 455/456.1 |
| 2011/0287734 A1* | 11/2011 | Isobe et al. | 455/404.1 |
| 2012/0053887 A1* | 3/2012 | Nurmi | 702/150 |
| 2013/0012154 A1* | 1/2013 | Ramos | 455/404.2 |

* cited by examiner

DONUT ALERT MESSAGING

CROSS-REFERENCE TO RELATED APPLICATIONS

This application is a continuation of, and claims priority to, U.S. patent application Ser. No. 13/712,488, filed Dec. 12, 2012, which is now U.S. Pat. No. 8,688,071, issued Apr. 1, 2014, the contents of which is incorporated by reference herein in its entirety.

TECHNICAL FIELD

The technical field generally relates to telecommunications and more specifically relates to notification management.

BACKGROUND

The Commercial Mobile Alert System (CMAS) was established by the Federal Communications Commission (FCC) to allow wireless service providers to send emergency alerts to their subscribers. Such alerts may be in the form of text messages, audio, and video alerts. The CMAS network will allow emergency service agencies, such as the Federal Emergency Management Agency (FEMA), to accept and aggregate alerts from federal, state, and local emergency operations centers, and send the alerts over a secure interface to wireless providers. The wireless providers can then distribute the alerts to their subscribers.

While the FCC has proposed and adopted the network structure, technical requirements, and operating procedures for the CMAS, wireless service providers that participate in the CMAS must develop their own systems to receive alerts from FEMA and distribute them to their subscribers. Attributes of CMAS messages may be used by wireless service providers and user devices for various functions.

Commercial mobile alert message (CMAM) may be transmitted from an alert gateway to a commercial mobile service provider (CMSP) Gateway, and may be based on common alert protocol (CAP) key fields. Currently, CAP is not able to provide different messages to different persons within a common geographic region.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

In an embodiment, a device may have a processor communicatively connected with a memory. The memory may have instructions that effectuate the actions of receiving first information for a first emergency alert area, receiving second information for a second emergency alert area, wherein the second emergency alert area is geographically located within the first emergency alert area, and receiving device information from a device. In addition, the instructions may comprise determining what area the device is located in based on the device information and providing a corresponding emergency alert message for the device based on the determined area. The second emergency alert area may have a perimeter that does not cross a perimeter of the first emergency alert area.

BRIEF DESCRIPTION OF THE DRAWINGS

The following detailed description of example embodiments is better understood when read in conjunction with the appended drawings. For the purposes of illustration, the drawings show exemplary embodiments. The subject matter is not limited to the specific elements and instrumentalities disclosed. In the drawings.

DETAILED DESCRIPTION OF ILLUSTRATIVE EMBODIMENTS

Figure 1:
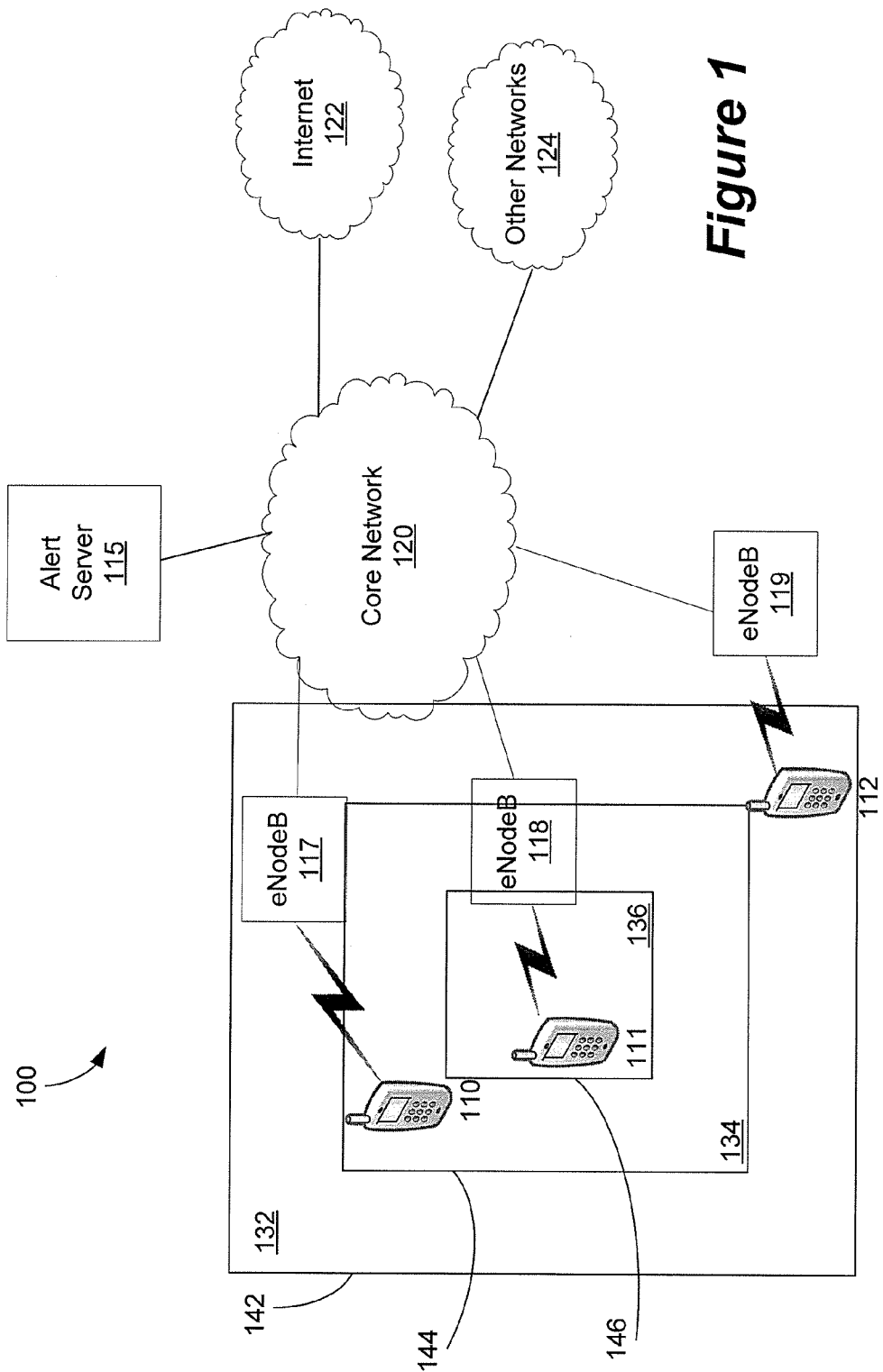
FIG. 1 illustrates a non-limiting exemplary network configuration for long term evolution (LTE) according to one or more disclosed embodiments of donut alert messaging.

FIG. 1 is an exemplary illustration of a communications system 100 in which one or more of the disclosed embodiments may be implemented. In FIG. 1, wireless transmit/receive units (WTRU) 110, WTRU 111, and WTRU 112 may be wirelessly connected, respectively, to evolved node Bs (eNodeB) 117, eNodeB 118, and eNodeB 119. The eNodeB 117, eNodeB 118, and eNodeB 119 may be connected to core network 120. Core network 120 may be connected with an alert server 115. As shown in FIG. 1, the communications system 100 may also include the Internet 122 and other networks 124. The disclosed embodiment contemplates any number of WTRUs, eNodeBs, networks, and/or network elements.

Each WTRU may reside within one or more geographic regions. Here, WTRU 112 may be considered to reside in Region 132. While WTRU 110 may be considered to reside in Region 134 and WTRU 111 may reside in Region 136. Region 132 is bound by outer line 142 and inner line 144. Region 134 is bound by outer line 144 and inner line 146. Region 136 is bound by outer line 146. Region 132, 134, and 136 may be part of a related emergency situation (e.g., adverse weather), but may have a different alert message for each region. For example, WTRU 111 in an inner region 136 at which an emergency situation exists may receive a message to stay in shelter. WTRU 110 in surrounding region 134 surrounding the inner region 136 may receive a message to evacuate. While WTRU 112 in an outer region 132 outside of region 136 and 134 may receive a message to stay away from region 134 and region 136.

Figure 2:
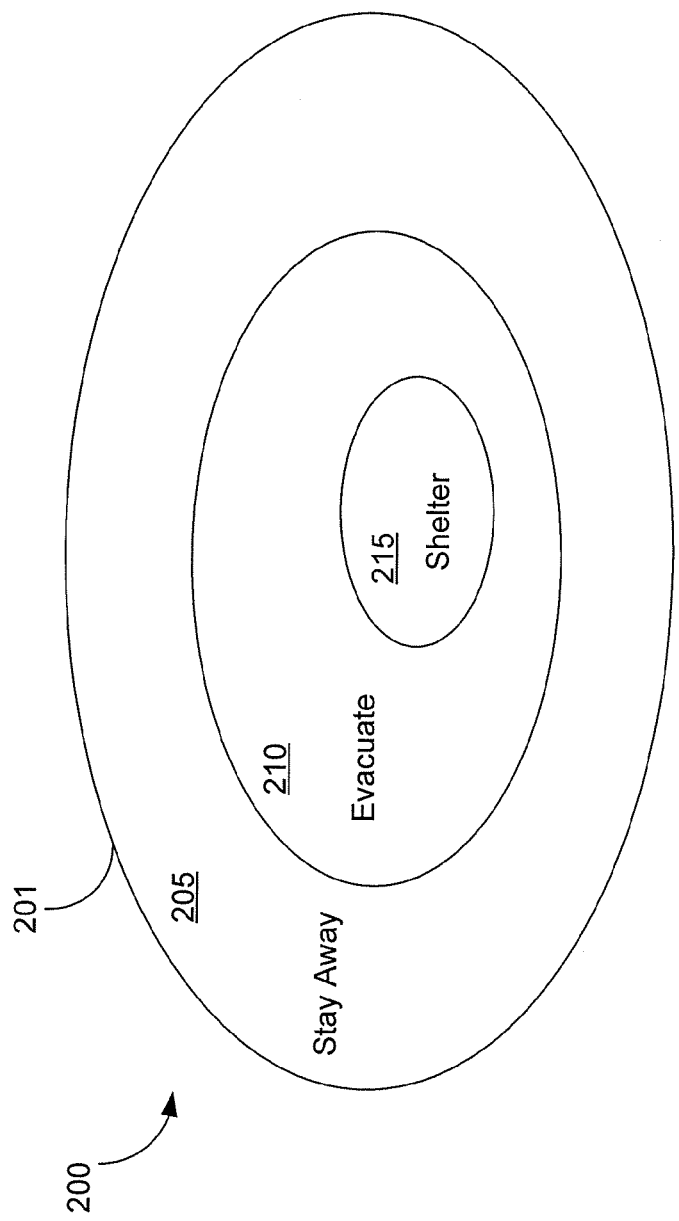
FIG. 2 illustrates a non-limiting exemplary network configuration according to one or more disclosed embodiments of donut alert messaging.

FIG. 2 is an exemplary embodiment that comprises three nested geographic regions. Region 205 comprises the perimeter of a geographic region and is bound by an inner nested geographic region 210. The geographic region 210 is bound by another inner nested geographic region 215. Nested regions, such as those shown in FIG. 2, can be defined as one region inside another in which the perimeter does not overlap or cross. The regions may be further described as concentric if they share the same center point, axis, or origin. Generally, the shape of a region may comprise any appropriate polygon or other closed shape. The geographic regions do not have to be nested, any geographic region may extend beyond the boundary of any other geographic region, and the geographic regions may overlap. Example regions may include circles, ovals, tubes, cylindrical shafts, disks, spheres, etc. In an embodiment, devices located in region 205 may receive a message to stay away from regions 210 and 215. Region 210 may receive a message to evacuate. And region 215 may receive a message to shelter in place. Also the message for region 215, which may have the most dangerous conditions, may also include the location of emergency services if sheltering in place is not an option (e.g., a life threatening injury). In an embodiment, direction of movement of a mobile device may be considered. For example, if a mobile device is in region 205 and moving toward region 210, the mobile device may receive a message to turn around. The message may be rendered via text along with an overlay map of the current position of the mobile device and the current or forecast emergency alert areas, for example.

In an embodiment, a mobile device may periodically receive multiple alert messages and render one of the messages based on the location (e.g., region) of the mobile device. For example, upon receipt of an emergency alert with multiple messages, the device may determine its location and render the appropriate message based on the location of the device. Location may be determined by global positioning system (GPS) or the like. In an embodiment, a forecast of the alert related areas over time may be created. The forecast may be similar in implementation to an adverse weather forecast (e.g., tornado). The forecast along with alert messages based on the position of the mobile device may be periodically sent to the mobile device. There may be additional information provided to the mobile device with specific instruction as to which direction to move away from an alert region. The information may be dynamic, providing directions to highways, warnings of bridges that may be closed/non-passable, and the like. In another embodiment, an approach may be implemented wherein a network entity may determine a location of a device, and send the appropriate message based on the location of the device. In an embodiment, the network entity may send messages or otherwise indicate to a plurality of end devices to display messages at the same time for the different alert areas.

Figure 3:
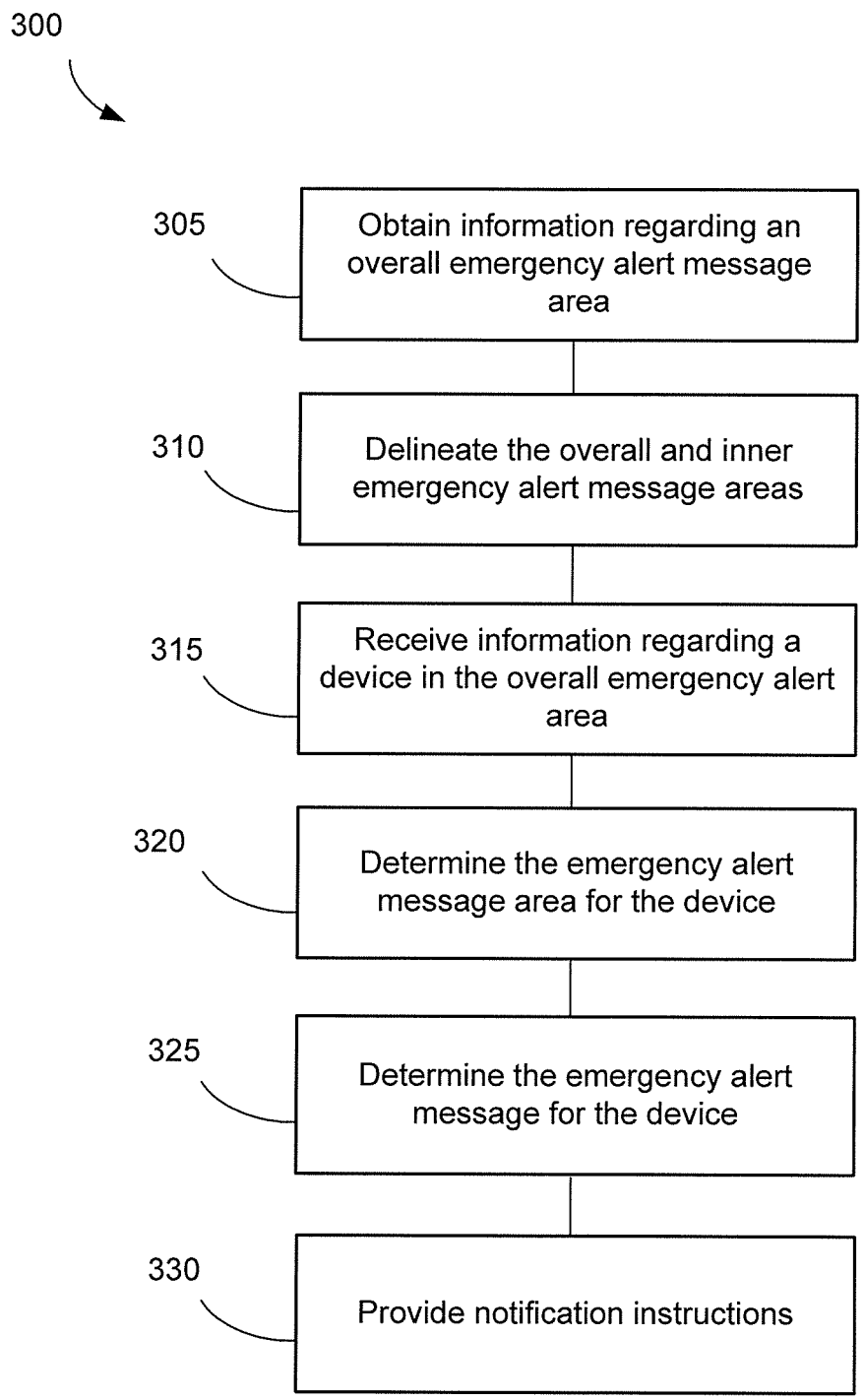
FIG. 3 illustrates a non-limiting exemplary method of implementing one or more disclosed embodiments of donut alert messaging.

FIG. 3 illustrates a non-limiting exemplary method 300 of implementing one or more disclosed embodiments of donut alert messaging with reference to FIG. 2. In method 300 at block 305, an alert server may obtain information regarding an overall emergency alert message area (e.g., area 200). The overall emergency alert message area as described herein includes all areas within a limiting boundary. For example, overall emergency alert message area 200 comprises everything within outside boundary 201.

At block 310, the alert server may delineate the overall emergency alert message area (e.g., area 200) into smaller inner areas (e.g., area 205, 210, and 215) that may have different levels of emergency severity or different emergency alert messages. The emergency alert message area boundaries may be determined based on weather forecasts, law enforcement officials, reports of others about conditions they observe in the area, and the like. The inner and overall emergency alert message areas may be defined by mapping the geographic coordinates (e.g., longitude and latitude) to a shape of the covered areas based on the determined boundaries. A default shape such as circular shape may be used to simplify the process in determining the emergency alert message area boundaries. In an embodiment, a center point may be selected and then a distance from the center point may be chosen in order to define the emergency alert message area boundaries.

At block 315, the alert server may receive information regarding devices in the overall emergency alert message area (e.g., 200). In an embodiment, the alert server may receive information about a device such as the location (e.g., GPS coordinates) of the device in the overall emergency alert message area, the direction the device is moving, the speed of the device, and the messaging capability of the device (e.g., SMS, e-mail, video, or voice). At block 320, the emergency alert message area (e.g., area 205, 210, and 215) for the device may be determined. The determined emergency alert message area of the device may be based on the expected location of the device after analyzing the speed of movement of the device. At block 325, the emergency alert message for the device may be determined based on the determined emergency alert message area. At block 330, notification instructions for the type of emergency alert message may be provided.

Figure 4:
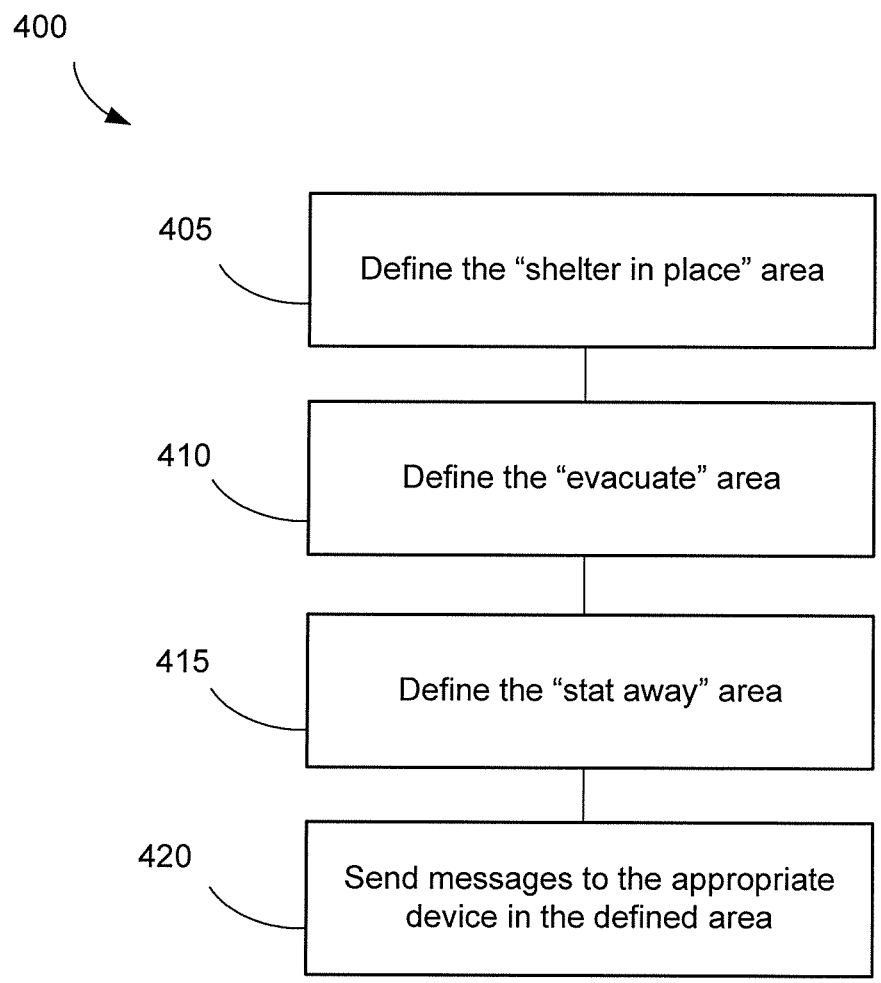
FIG. 4 illustrates another non-limiting exemplary method 400 of implementing one or more disclosed embodiments.

FIG. 4 illustrates another non-limiting exemplary method 400 of implementing one or more disclosed embodiments using specific syntax for donut alert messaging. The described method 400 references FIG. 2 and Table 1. Table 1 includes definitions of terms as used in the description of exemplary method 400.

TABLE 1

| Term | Definition |
|---|---|
| AREA | Set of points (area) defined by a polygon or other shape. |
| NOT | "Reciprocal" operation. For example, NOT AREA 215 is the set of points outside of the shape for AREA 215 |
| AND | The "both" operation. For example, AREA 215 AND AREA 210 is the set of points which are contained in both AREA 215 and AREA 310 |
| OR | The "Either" operation. For example, AREA 215 OR AREA 210 is the set of points which are contained in either AREA 215 or in AREA 210. |
| EXCEPT | The "but not" operation. For example, AREA 210 EXCEPT AREA 215 is the set of points contained within AREA 210 but not contained within AREA 215. |
| NESTED | The situation where one area is wholly contained within another area. For example, in FIG. 2, AREA 215 is nested within AREA 210. |
| ( ) | Parentheses to define order and precedence. |

In an exemplary scenario, a railroad tank car may be leaking chlorine gas. An Emergency Manager may want to do the following: 1) notify subscribers in the immediate vicinity to shelter in place; 2) notify subscribers outside the immediate vicinity but still within the danger area to evacuate; and 3) notify subscriber outside the danger area to stay away. This scenario may be represented by the double donut illustrated in FIG. 2.

The method of FIG. 4 may be performed to prepare and provide information to a subscriber in the affected areas. At block 405 the shape of the area for "shelter in place" may be described with syntax AREA 215. AREA 215 may be an area in which it may be safer to stay put rather than caught in a panic situation that may endanger a subscriber (e.g., sitting in traffic in the affected area rather staying at home). For simplicity the "shelter in place" area as described with syntax herein will be labeled Shelter. At block 410, the shape of the area for "evacuate" may be described with syntax AREA 210 EXCEPT AREA 215. For simplicity the "evacuate" area as described with syntax herein will be labeled Evacuate. The "evacuate" area may be an area that is relatively safe for people to evacuate, but there may be a potential for shifting winds or other issues that may cause a problem. At block 415, the shape of the area for "stay away" may be described with syntax AREA 205 EXCEPT AREA 210 if the areas are nested as shown in FIG. 2. The general syntax for non-nested areas within the "stay away" area may be:

AREA 205 EXCEPT (AREA 2100R AREA 215).

For simplicity the "stay away" area as described with syntax herein will be labeled Stay Away. The "stay away" area may be an area that is safe, but may be close to AREA 210 and could cause evacuation issues if subscribers did not stay away.

At block 420, after the areas have been defined, an appropriate message may be sent to devices in the defined areas. The messages may change as the location of a device moves from one area to the next. The alert messages may also include instructions or assignments of where a subscriber should go (e.g., a map with text directions), based on subscribers in the area at the time of the emergency. The assignments may assist in an orderly evacuation of an area. Although nested areas are described herein, the methods and systems may apply to areas that are not nested, but overlap. The alert messages as described with regard to method 400 are exemplary and are not limiting to the type of alert messages that may be generated.

Existing protocols such as the CAP version 1.1 protocol define an alert message and allow for multiple alert areas to be defined. However, existing protocols do not support the definition of target areas as described in the example scenarios and do not allow different message for each target area. To support donut alert messaging, as described herein, a geographic based protocol may be enhanced to include the following: 1) definition of multiple areas; 2) definition of one or more target areas using a syntax of the operators defined in Table 1 or the like; and/or 3) alert messages associated with each individual target area.

An alert message may be issued for public safety or other emergency or non-emergency purposes. For example, an alert message may include a description of a recent or imminent event such as a natural disaster, domestic or foreign terrorist threat, or the like, along with instructions detailing how to respond to the event, for example, by seeking safety in a particular location or location type, organizing in a certain manner, or the like. An alert message may include information that is meaningful to a user for response to an event. For example, in the case of an earthquake, the alert message may contain instructions for seeking appropriate safe haven, information on availability of assistance, escape routes, or the like.

Although in some implementations of the present technology GPS receivers are used as a positioning module to determine the current location of each device, it should be appreciated that other techniques can be used to determine the current location to a degree of accuracy commensurate with the technique used. For example, cell tower triangulation or radiolocation techniques, as mentioned above, can be used to generate the current location for the device. Alternatively, the identity (and location) of the cell tower handling the device's communications can be used as a proxy for the location of the device. Another approach may be to prompt the user of the device to enter his or her current location (e.g. entering a street address, picking a point of interest from a map or selecting the current location using crosshairs on a map). As yet another example, Global Navigation Satellite Systems (GNSS) or pseudo-satellite systems other than or in addition to the currently deployed GPS system may be used. Satellite-based, regional, or network-based augmentation or improvement systems such as WAAS and A-GPS may also be utilized to aid in positioning.

Figure 5:
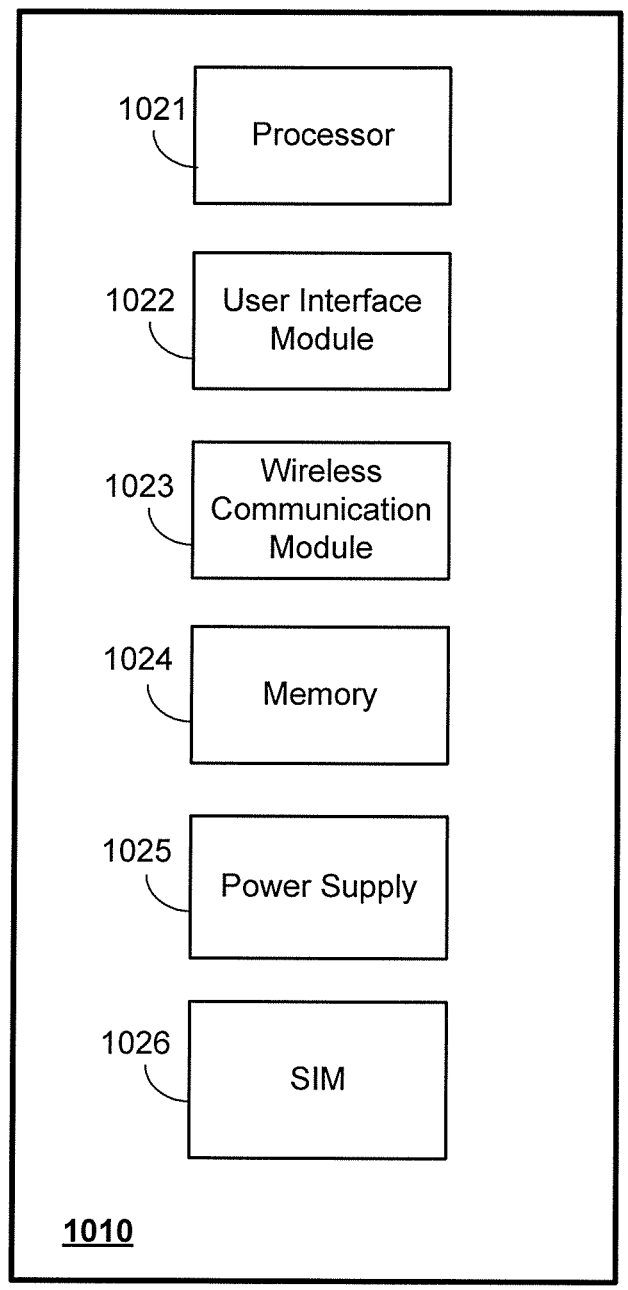
FIG. 5 is a block diagram of a non-limiting exemplary mobile device in which aspects of one or more disclosed embodiments of donut alert messaging may be implemented.

FIG. 5 illustrates an example wireless device 1010 that may be used in connection with an embodiment. References will also be made to other figures of the present disclosure as appropriate. For example, mobile devices 110 and 111 may be wireless devices of the type described in regard to FIG. 5, and may have some, all, or none of the components and modules described in regard to FIG. 5. It will be appreciated that the components and modules of wireless device 1010 illustrated in FIG. 5 are illustrative, and that any number and type of components and/or modules may be present in wireless device 1010. In addition, the functions performed by any or all of the components and modules illustrated in FIG. 5 may be performed by any number of physical components. Thus, it is possible that in some embodiments the functionality of more than one component and/or module illustrated in FIG. 5 may be performed by any number or types of hardware or a combination of hardware and software.

Processor 1021 may be any type of circuitry that performs operations on behalf of wireless device 1010. Such circuitry may include circuitry and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one embodiment, processor 1021 executes software (computer readable instructions stored in a computer readable storage medium which is not a transient signal) that may include functionality related to donut alert messaging, for example. User interface module 1022 may be any type or combination of hardware or a combination of hardware and software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware or a combination of hardware and software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 6:
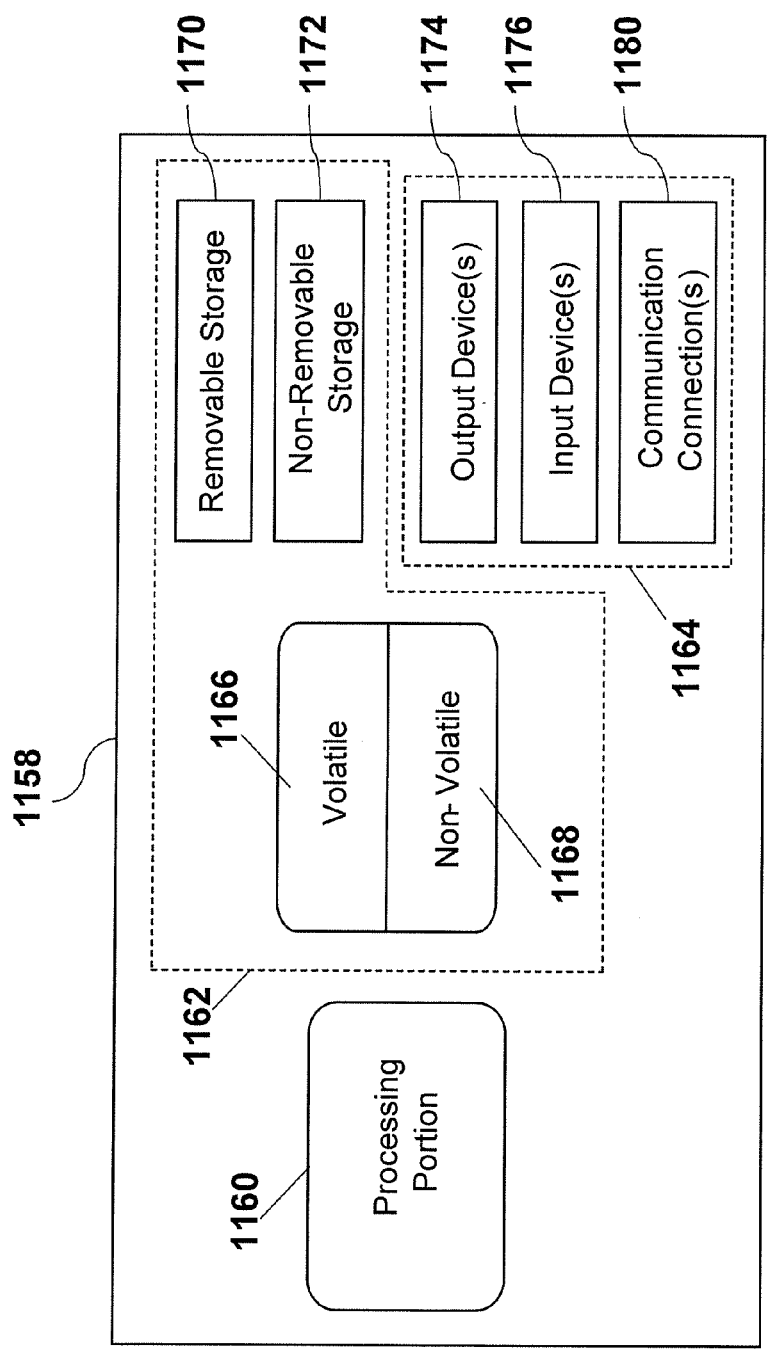
FIG. 6 is a block diagram of a non-limiting exemplary processor in which aspects of one or more disclosed embodiments of donut alert messaging may be implemented.

FIG. 6 is a block diagram of an example processor 1158 which may be employed in any of the embodiments described herein, including as one or more components of mobile devices 110 and 111, as one or more components of network equipment such as MMEs, and HSSs, and/or CMS, or any other component of networks 110 and 111, and/or any related equipment, and/or as one or more components of any third party system or subsystem that may implement any portion of the subject matter described herein. It is emphasized that the block diagram depicted in FIG. 6 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 6, the processor 1158 comprises a processing portion 1160, a memory portion 1162, and an input/output portion 1164. The processing portion 1160, memory portion 1162, and input/output portion 1164 are coupled together (coupling not shown in FIG. 6) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for donut alert messaging, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158 and is not a transient signal.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media, wherein storage media is not a transient or propagated signal. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how donut alert messaging may be implemented with stationary and non-stationary network structures and architectures in order to do donut alert messaging. It can be appreciated that donut alert messaging as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, donut alert messaging may be applied independently of the method of data transport and does not depend on any particular network architecture or underlying protocols.

Figure 7:
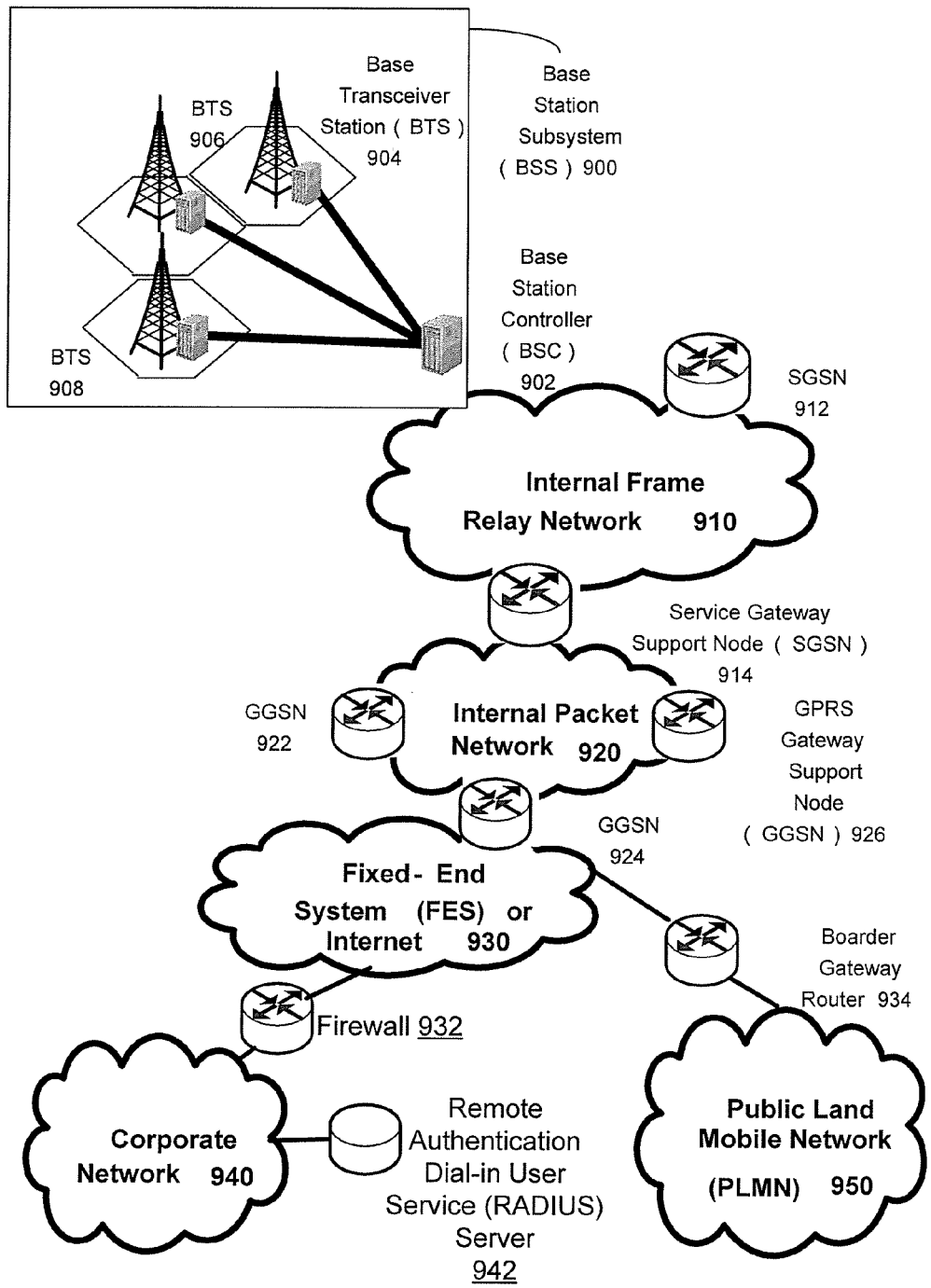
FIG. 7 is a block diagram of a non-limiting exemplary packet-based mobile cellular network environment, such as a GPRS network, in which one or more disclosed embodiments of donut alert messaging may be implemented.

FIG. 7 depicts an overall block diagram of an exemplary packet-based mobile cellular network environment, such as a GPRS network, in which donut alert messaging such as those described herein may be practiced. In an example configuration, any RAN as described herein may be encompassed by or interact with the network environment depicted in FIG. 7. Similarly, mobile devices 110 and 111 may communicate or interact with a network environment such as that depicted in FIG. 7. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 110 and 111) become connected to the wireless network. In exemplary fashion, the packet traffic originating from user devices (e.g., mobile devices 110 and 111) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 8:
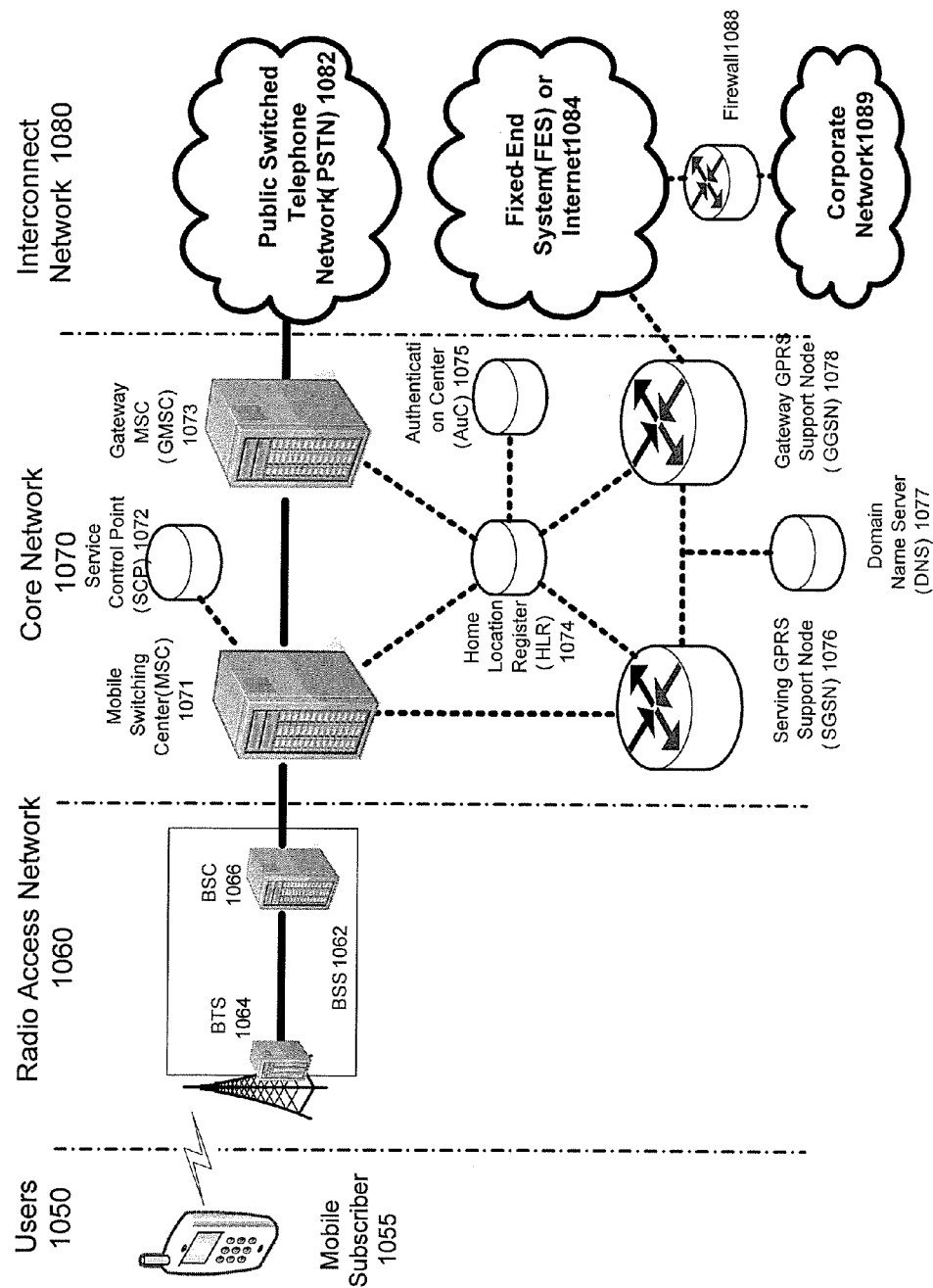
FIG. 8 illustrates a non-limiting exemplary architecture of a typical GPRS network, segmented into four groups, in which one or more disclosed embodiments of donut alert messaging may be implemented.

FIG. 8 illustrates an architecture of a typical GPRS network in which one or more disclosed embodiments of donut alert messaging may be implemented. The architecture if FIG. 8 is segmented into four groups: users 1050, radio access network 1060, core network 1070, and interconnect network 1080. Users 1050 may comprise a plurality of end users (though only mobile subscriber 1055 is shown in FIG. 8). In an example embodiment, the device depicted as mobile subscriber 1055 may comprise any of mobile devices 110 and 111. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 8, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 110 and 111, used by an end user of a mobile cellular service or a wireless provider. When a mobile subscriber turns on his or her mobile device, the mobile device may go through an attach process by which the mobile device attaches to an SGSN of the GPRS network. In FIG. 8, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of donut alert messaging such as those described herein may include, but are not limited to, Gateway GPRS Support Node tables, Fixed End System router tables, firewall systems, VPN tunnels, and any number of other network elements as required by the particular digital network.

Figure 9:
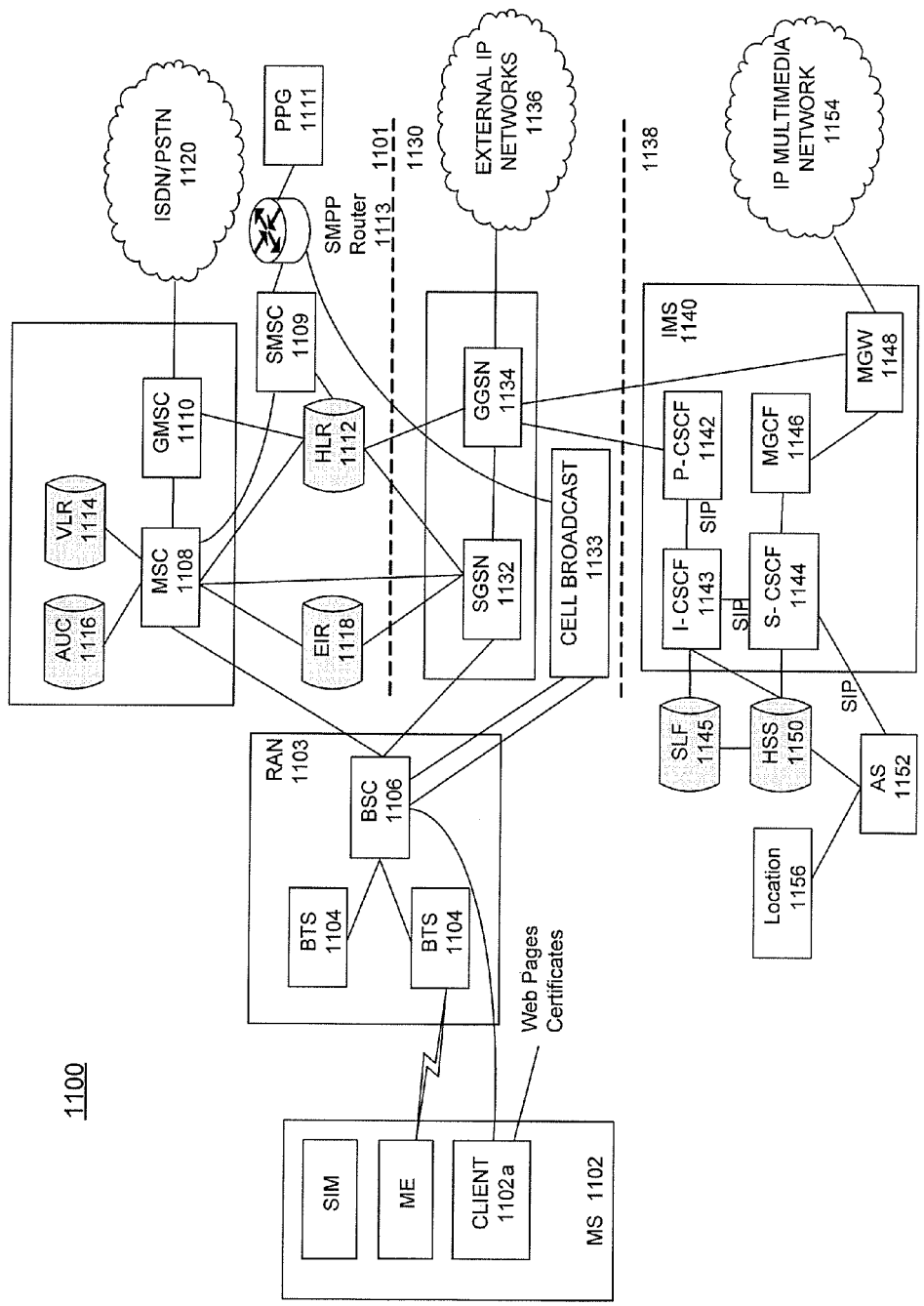
FIG. 9 illustrates a non-limiting alternate block diagram of an exemplary GSM/GPRS/IP multimedia network architecture in which one or more disclosed embodiments of donut alert messaging may be implemented.

FIG. 9 illustrates another exemplary block diagram view of a GSM/GPRS/IP multimedia network architecture 1100 in which the systems and methods for donut alert messaging such as those described herein may be incorporated. As illustrated, architecture 1100 of FIG. 9 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 110 and 111) that is used by mobile subscribers, in one embodiment with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 10:
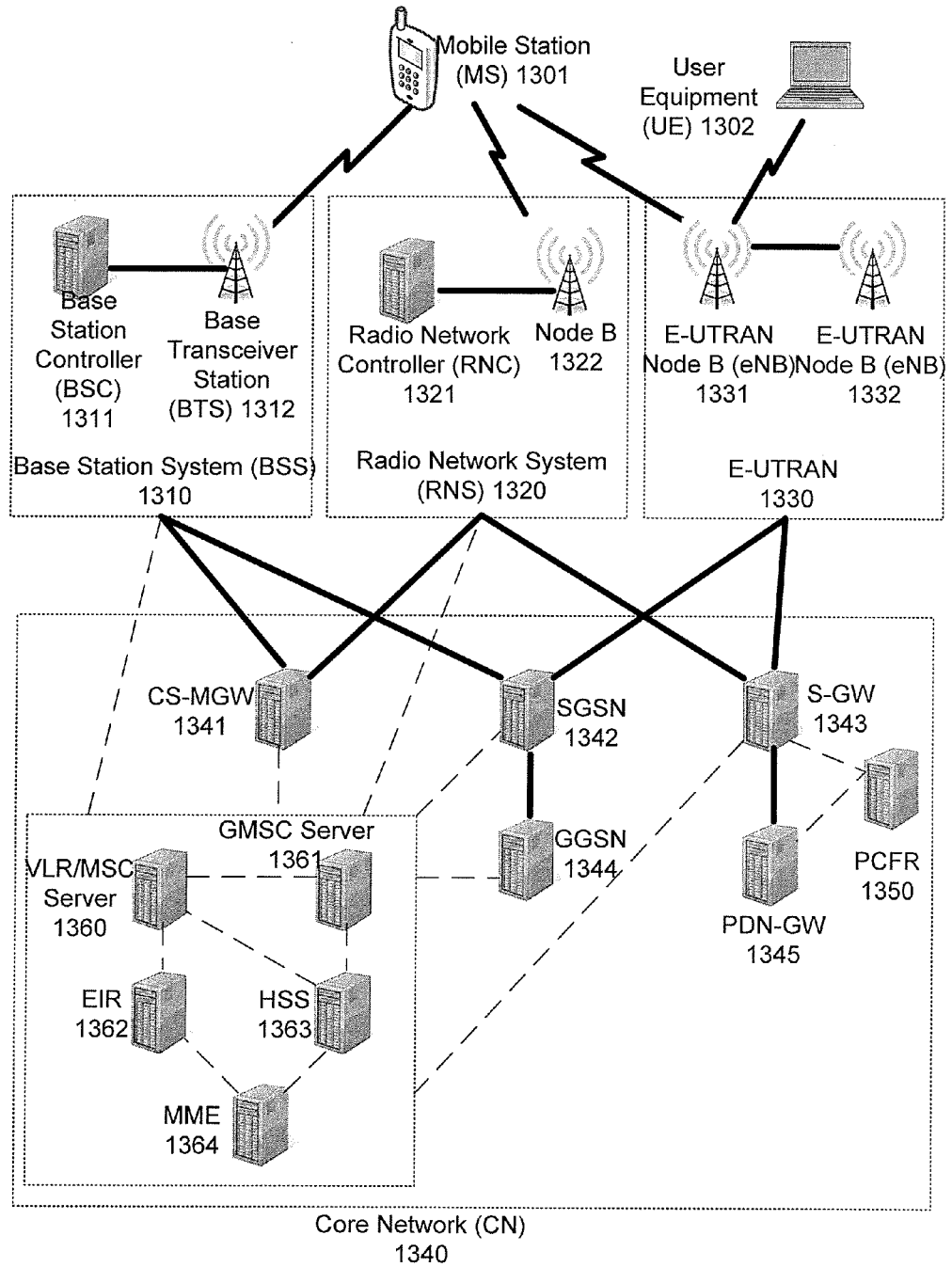
FIG. 10 illustrates a PLMN block diagram view of an exemplary architecture in which one or more disclosed embodiments of donut alert messaging may be implemented.

FIG. 10 illustrates a PLMN block diagram view of an exemplary architecture in which one or more disclosed embodiments of donut alert messaging may be implemented. Mobile Station (MS) 1301 is the physical equipment used by the PLMN subscriber. In one illustrative embodiment, communications device 40 may serve as Mobile Station 1301.

Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 10 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical embodiment, user equipment may be classified as either "white listed" or "black listed" depending on its status in the network. In one embodiment, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While example embodiments of systems and methods for donut alert messaging have been described in connection with various communications devices and computing devices/processors, the underlying concepts can be applied to any communications or computing device, processor, or system capable of implementing the donut alert messaging described. The various techniques described herein may be implemented in connection with hardware or a combination of hardware and software. Thus, the methods and apparatuses for donut alert messaging, or certain aspects or portions thereof, can take the form of program code (i.e., instructions) embodied in tangible and/or a medium that is not a transient signal, such as floppy diskettes, CD-ROMs, hard drives, or any other machine-readable storage medium, wherein, when the program code is loaded into and executed by a machine, such as a computer, the machine becomes an apparatus for donut alert messaging. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for donut alert messaging may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for donut alert messaging. When implemented on a general-purpose processor, the program code combines with the processor to provide a unique apparatus that operates to invoke the functionality of donut alert messaging as described herein. Additionally, any storage techniques used in connection with an donut alert messaging system may invariably be a combination of hardware and software.

While donut alert messaging has been described in connection with various embodiments of various figures, it is to be understood that other similar embodiments may be used or modifications and additions may be made to the described embodiments for performing the same function of donut alert messaging without deviating therefrom. The terms "region" and "area" as described herein are primarily used interchangeably. The alert messaging described herein, although discussed in separate exemplary embodiments, may be modified to combine or delete features of the exemplary embodiments. For example, one skilled in the art will recognize donut alert messaging as described in the present application may apply to any environment, whether wired or wireless, and may be applied to any number of such devices connected via a communications network and interacting across the network. Therefore, donut alert messaging should not be limited to any single embodiment, but rather should be construed in breadth and scope in accordance with the appended claims.

What is claimed is:

1. A computer readable storage medium comprising computer executable instructions that when executed by a computing device cause the computing device to perform the instructions comprising:
   receiving first information for a first emergency alert area, the first information comprising a geographic boundary of the first emergency alert area;
   receiving second information for a second emergency alert area, wherein the second emergency alert area is geographically located within the first emergency alert area;
   receiving device information associated with a device, the device information comprising location information of the device;
   determining an area in which the device is located based on the device information, the area comprising one of the first emergency alert area or the second emergency alert area;
   determining an emergency alert message for the device based on the determined area, the emergency alert message comprising a map of a current position of the device, a current emergency alert area, and a forecast emergency alert area; and
   providing instructions to send the emergency alert message.

2. The computer readable storage medium of claim 1, wherein the second emergency alert area has a perimeter that does not cross a perimeter of the first emergency alert area.

3. The computer readable storage medium of claim 1, further comprising computer executable instructions that when executed by a computing device cause said computing device to perform the instructions comprising:
   generating a first alert message for the first emergency alert area; and
   generating a second alert message for the second emergency alert area.

4. The computer readable storage medium of claim 1, wherein the first emergency alert area and the second emergency alert area are nested.

5. The computer readable storage medium of claim 1, wherein device information comprises direction of movement of the device.

6. The computer readable storage medium of claim 1, wherein device information comprises speed of movement of the device.

7. The computer readable storage medium of claim 1, wherein the first emergency alert area and the second emergency alert area are based on an adverse weather condition, a natural disaster, or a terrorist attack.

8. The computer readable storage medium of claim 1, wherein the emergency alert message comprises an escape route, a stay in shelter message, an evacuate message, or a stay away message.

9. The computer readable storage medium of claim 1, further comprising computer executable instructions that when executed by a computing device cause said computing device to perform the instructions comprising:
   receiving a plurality of emergency alert messages, and
   rendering at least one of the received plurality of emergency alert messages based on the location information of the device.

10. A system comprising:
    a processor communicatively connected with a mobile device; and
    a memory coupled with the processor, the memory having stored thereon executable instructions that when executed by the processor cause the processor to effectuate operations comprising:
       receiving first information for a first emergency alert area, the first information comprising a geographic boundary of the first emergency alert area;
       receiving second information for a second emergency alert area, wherein the second emergency alert area is geographically located within the first emergency alert area;
       receiving device information associated with the mobile device, the device information comprising location information of the mobile device;
       determining an area in which the mobile device is located based on the device information, the area comprising the first emergency alert area, or the second emergency alert area; and
       determining an emergency alert message for the mobile device based on the determined area, the emergency alert message comprising a map of a current position of the mobile device, a current emergency alert area, and a forecast emergency alert area.

11. The system of claim 10, wherein the second emergency alert area has a perimeter that does not cross a perimeter of the first emergency alert area.

12. The system of claim 10, wherein the mobile device periodically receives a plurality of emergency alert messages and renders at least one of the received plurality of emergency alert messages based on the location information of the mobile device.

13. The system of claim 10, executable instructions that when executed by the processor cause the processor to effectuate operations comprising:
    generating a first alert message for the first emergency alert area; and
    generating a second alert message for the second emergency alert area.

14. The system of claim 10, wherein device information comprises direction of movement of the mobile device.

15. The system of claim 10, wherein the first emergency alert area and the second emergency alert area are based on an adverse weather condition, a natural disaster, or a terrorist attack.

16. The system of claim 10, wherein the emergency alert message comprises an escape route or a stay in shelter message.

17. The system of claim 10, wherein the emergency alert message comprises an evacuate message or a stay away message.

18. The system of claim 10, wherein device information comprises speed of movement of the mobile device.

19. A mobile device comprising:
    a processor; and
    a memory coupled with the processor, the memory having stored thereon executable instructions that when executed by the processor cause the processor to effectuate operations comprising:
       receiving first information for a first emergency alert area, the first information comprising a geographic boundary of the first emergency alert area;
       receiving second information for a second emergency alert area, wherein the second emergency alert area is geographically located within the first emergency alert area;
       determining an area in which the mobile device is located based on mobile device information comprising location information of the mobile device, the area comprising the first emergency alert area or the second emergency alert area; and
       determining an emergency alert message for the mobile device based on the determined area, the emergency alert message comprising a map of a current position of the mobile device, a current emergency alert area, and a forecast emergency alert area.

20. The mobile device of claim 19, further comprising computing device to perform the instructions comprising:
    receiving a plurality of emergency alert messages; and
    rendering at least one of the received plurality of emergency alert messages based on the location information of the mobile device.

* * * * *